Patented Feb. 21, 1950

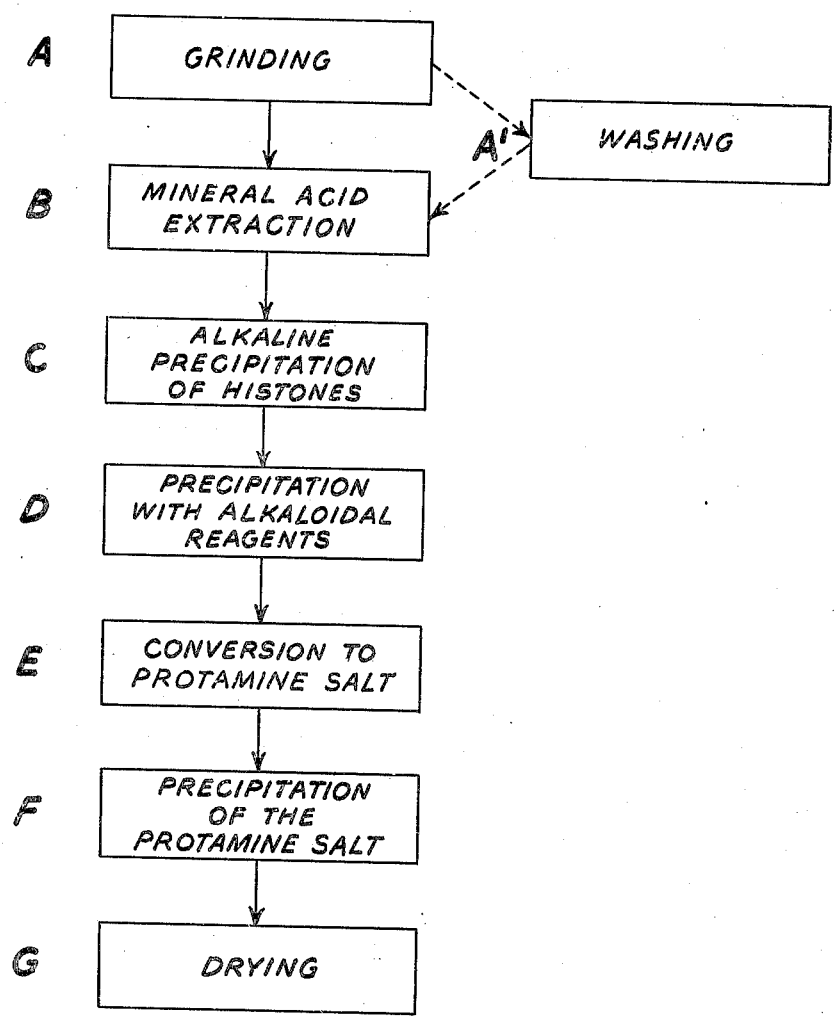

2,497,858

UNITED STATES PATENT OFFICE 2,497,858

PROCESS FOR PREPARING PROTAMINES

Richard J. Block, Scarsdale, N. Y., assignor to The Borden Company, New York, N. Y., a corporation of New Jersey Application February 10, 1948, Serial No. 7,448

11 Claims. (Cl. 260—112)

This invention relates in general to a method for extracting protamines from milt of fish, and products resulting therefrom.

Heretofore attempts have been made to extract protamines from fish milt by various methods such as centrifuging, precipitating, and the like. Such methods have either been too costly or the yields obtained have been quite low. None of these prior processes has included a simple but efficient method for the production of protamines having a high degree of purity with a good yield of the final product.

It was, therefore, a general object of the present invention to provide a process for extracting protamines from fish milt which would overcome the disadvantages encountered in the prior art.

It was a further object of the invention to provide a process for extracting protamines from the milt of fish, which process was relatively simple and at the same time would yield a high percentage of protamine with a relatively high degree of purity.

Further objects of the invention will in part be obvious and will in part appear from the following description, in which the preferred embodiments of the invention have been set forth in detail.

In the attached drawing there is shown by way of illustration a flow sheet giving various steps A to G which may be followed in carrying out the preferred process of the invention.

In general the steps of this process comprise:

A. Grinding the washed milt;
B. Mineral acid extraction of the milt residue;
C. Alkaline precipitation of the histones;
D. Precipitation with alkaloidal reagents;
E. Conversion to protamine salt;
F. Precipitation of the protamine salt;
G. Drying.

If desired, a second washing of the milt, step A', may be inserted after the grinding step A.

By the term "protamine," I mean those very simple basic proteins and protein split-products, commonly obtainable from the sperm and/or testicles of fishes, which in their composition include arginine and may include either or both histidine and lysine.

The invention accordingly comprises the several steps and the relation of one or more of such steps with respect to each of the others; and the product possessing the features and properties exemplified in the following detailed disclosure, and the scope of the invention will be indicated in the claims.

As the starting material there may be employed a ripe milt obtained from the various species of fish which are known to contain protamine, such as herring, salmon, mackerel, lump-sucker, sturgeon, trout, whitefish, shad, sculpin, and the like. Excellent results have been obtained by employing the milt of salmon and herring as the starting material. The milt ordinarily employed is that which is obtainable as a by-product from fish packers.

In the now preferred process, the milt is first washed with cold tap water to remove dirt, blood, or other impurities which may be present. The washed milt is then ground in any suitable manner, such as by passing it through a meat grinder, a mechanical blender, or other similar type of apparatus (step A). At this stage, if desired, the ground material may be rewashed with dilute citric acid solution (step A'), which facilitates subsequent handling, but step A' is not absolutely necessary and may be omitted if desired.

The residue is then extracted with a dilute mineral acid, such as 1% sulfuric acid, and the extract recovered (step B). The extract is then made alkaline, preferably within a pH range of about 8 to 12, with an alkaline material such as ammonium hydroxide, ammonia gas, and the like (step C). The precipitate formed as a result of this treatment, containing histones and other impurities, may be discarded or recovered and used for other purposes, if so desired.

The filtrate from step B is next recovered and treated with an alkaloid reagent to precipitate the protamine (step D). The precipitate resulting from step D is then recovered and treated with an excess of acid to convert the protamine to the corresponding salt of that acid (step E). The protamine salt is then precipitated with a water-miscible organic solvent such as alcohol, acetone, or the like (step F). The protamine salt thus precipitated is found to be quite pure and may be dried by any conventional method, such as oven drying, roll drying, or the like (step G).

For the mineral acids used in step B there may be employed hydrochloric acid, sulfuric acid, phosphoric acid, nitric acid, and the like, preferably in dilute form.

The alkaline precipitating agents which may be employed in step C comprise aqueous or gaseous ammonia, alkaline phosphates (for example, trisodium phosphate to which there is added a small amount of caustic soda), basic amines, and the like.

For the alkaloid reagents used in step D there may be employed metaphosphoric acid, trisodium phosphate, cellulose sulfate, lignin sulfonate, picric acid, flavianic acid, and the like.

In step E there may be employed various acids such as dilute hydrochloric acid, dilute sulfuric acid, dilute nitric acid, and the like. Step E may be omitted if it is desired, and the protamine salt recovered at this stage in the form of a metaphosphate, picrate, or the like.

For purposes of illustration, but not by way of limiting the invention, the following examples are given. All parts are by weight unless otherwise specified.

Example 1

1000 g. of frozen salmon milt were partially thawed and rinsed with ordinary tap water to remove foreign matter such as blood, dirt particles, and the like. The milt was then ground in a mechanical mill to a fine mass. There was added to the milt during the step of grinding about 500 ml. to one liter of 1% citric acid solution. After the material was ground, it was then diluted to 3 to 4 liters by adding a sufficient additional amount of 1% citric acid solution. The diluted mass was allowed to stand in a refrigerator at about 2°–4° C. over night, and the insoluble material which forms on standing was then removed preferably by centrifuging. The residue was washed with one-third of the original volume of 1% citric acid solution and the filtrate and washings discarded.

The residue was then suspended in about 3¼ to 4½ liters of 0.2 normal hydrochloric acid and the extraction allowed to continue at room temperature for about 18 to 20 hours with occasional agitation, after which the mass was centrifuged and the filtrate was further clarified by filtering. The filtrate at this point was almost water-clear, and at most only slightly opalescent. The residue was again washed with about 1 to 1½ liters of 0.2 normal hydrochloric acid, centrifuged, clarified, and the two filtrates then combined.

All washings were added to the combined filtrates. The substance thus recovered was then heated to boiling and sufficient dilute ammonia added to adjust the pH to about 7 to 8, whereupon a precipitate was formed, thought to be histone, which was removed by centrifuging; after which additional ammonia was added at about 30° C. to the liquor in an amount sufficient to raise the pH to about 9.4 to 9.6. There was again formed a precipitate which was removed by filtration. The various filtration steps were found to be aided considerably through the use of various filter aids such as diatomaceous earth, and the like. The amount of ammonia employed in this example was approximately 130 to 150 ml. of 28% ammonium hydroxide.

The filtrate, which at this point amounted to about 5 to 7 liters, was then cooled to about 12°–15° C. through the addition of sufficient cracked ice while stirring.

There was then added 33% metaphosphoric acid to the cooled solution containing the protamine to precipitate the protamine as protamine metaphosphate. In order to determine the amount of alkaloid reagent required for optimal precipitation, preliminary tests were made on a number of small samples withdrawn from the iced solution, representing aliquot parts of the solution, and varying graded quantities of freshly prepared 33% metaphosphoric acid added thereto, the resulting oily precipitates were centrifuged down and washed with tap water, and the quantity of metaphosphoric acid required for maximum yield was thus determined. The calculated quantity of 33% metaphosphoric acid was then slowly added to the major portion of the cooled solution while stirring and the precipitate or oil thus formed was then removed by centrifuging at a high speed. The amount of metaphosphoric acid is usually found to lie within 70 to 190 g. of this reagent, calculated on a dry weight basis. The precipitate was then thoroughly washed with water until the washings were found to be free from ammonia as indicated by the Nessler test. Washing with cold water is preferable as the cold water tends to harden the oil and this facilitates handling. A final rinse is then made with distilled water.

The protamine metaphosphate percipitate, e. g. salmin metaphosphate, at this stage was found to be relatively pure and may be used as the metaphosphate if so desired. Alternatively, the protamine metaphosphate thus formed may be converted into other protamine salts such as a sulfate, hydrochloride, or the like. The salmin metaphosphate was converted into the sulfate salt by dissolving the precipitate in a minimum quantity of 1.0 normal sulfuric acid at 100° C., and boiling continued until a small aliquot of the solution no longer gave a white cloud when it was cooled below 5° C. The solution of salmin sulfate thus formed was decolorized with a small amount of charcoal and then filtered to form a water-clear solution. It is ordinarily necessary to employ between 125 and 150 ml. of 1.0 normal sulfuric acid to effect the conversion. The concentration of the sulfuric acid is maintained at about 1.0 normal by adding sufficient distilled water from time to time to replace the water which is lost by boiling. Heating was discontinued as soon as the test quantity no longer clouded at below 5° C.

The salmin sulfate oil thus formed was precipitated by the addition of a water-miscible organic solvent, e. g., 95% ethyl alcohol. The solvent was then removed by filtration and the residue dried by addition of fresh solvent. If desired, however, the salmin sulfate may be dissolved in a minimum quantity of hot water and dried in any desired manner, such as by spray drying, drum drying, or the like.

Example 2

1000 g. of frozen herring milt were partially thawed and rinsed with ordinary tap water to remove foreign matter such as blood, dirt particles, and the like. The milt was then ground to a fine mass. There was added to the milt during the step of grinding about 500 ml. to one liter of 1% citric acid solution. After the material was ground, it was then diluted to 3 to 4 liters by adding a sufficient additional amount of 1% citric acid solution. The diluted mass was allowed to stand in a refrigerator at about 2°–4° C. over night and the insoluble material which forms on standing was then removed preferably by centrifuging. The residue was washed with one-third of the original volume of 1% citric acid solution and the filtrate and washings were discarded.

The residue was then suspended in about 3 to 4½ liters of 1% sulfuric acid and the extraction allowed to continue at room temperature for about 24 hours with occasional agitation, after which the mass was centrifuged and the filtrate further clarified by filtering. The filtrate at this point was almost water-clear, and at most only slightly opalescent. The residue was again washed with about 1 to 1½ liters of 1% sulfuric acid, centrifuged, clarified, and the two filtrates then combined.

All washings were added to the combined filtrates. The substance thus recovered was then heated to boiling and sufficient dilute ammonia added to adjust the pH to about 7 to 8, whereup a precipitate was formed, thought to be histone, which was removed by centrifuging, after which additional ammonia was added at about 30° C. to the liquor in an amount sufficient to raise the pH to about 9.4 to 9.6. There was again formed a precipitate which was removed by filtration. The various filtration steps were found to be aided considerably through the use of various filter aids such as diatomaceous earth, and the like. The amount of ammonia employed was approximately 130 to 150 ml. of 28% ammonium hydroxide.

The filtrate, which at this point amounted to about 5 to 7 liters, was then cooled to about 12°–15° C. through the addition of sufficient cracked ice while stirring.

There was then added 33% metaphosphoric acid to the cooled solution containing the protamine to precipitate the protamine as protamine metaphosphate. In order to determine the amount of alkaloid reagent required for optimal precipitation, preliminary tests were made on a number of small samples withdrawn from the iced solution, representing aliquot parts of the solution, and varying graded quantities of freshly prepared 33% metaphosphoric acid added thereto, the resulting oily precipitates centrifuged down and washed with tap water, and the quantity of metaphosphoric acid required for maximum yield was thus determined. The calculated quantity of 33% metaphosphoric acid was then slowly added to the major portion of the cooled solution while stirring and the precipitate or oil thus formed was then removed by centrifuging at a high speed. The amount of metaphosphoric acid is usually found to lie within 70 to 190 g. of this reagent, calculated on a dry weight basis. The precipitate was then thoroughly washed with water until the washings were found to be free from ammonia as indicated by the Nessler test. Washing with cold water is preferable as the cold water tends to harden the oil and this facilitates handling. A final rinse is then made with distilled water.

The protamine metaphosphate precipitate, e. g., clupeine metaphosphate, at this stage was found to be relatively pure and may be used as the metaphosphate if so desired.

The clupeine metaphosphate was converted into the hydrochloride by dissolving the precipitate in a minimum quantity of 1.0 normal hydrochloric acid at 100° C., and boiling continued until a small aliquot of the solution no longer gave a white cloud when it was cooled below 5° C. The solution of clupeine hydrochloride thus formed was decolorized with a small amount of charcoal and then filtered to form a water-clear solution. It is ordinarily necessary to employ between 125 and 150 ml. of 1.0 normal hydrochloric acid to effect the conversion. The concentration of the hydrochloric acid is maintained at about 1.0 normal by adding sufficient distilled water from time to time to replace the water which is lost by boiling. heating was discontinued as soon as the test quantity no longer clouded at below 5° C.

The clupeine hydrochloride oil thus formed was precipitated by the addition of a water-miscible organic solvent, e. g., acetone. The solvent was then removed by filtration and the residue was dried by addition of fresh solvent. If desired, however, the clupeine hydrochloride may be dissolved in a minimum quantity of hot water and dried in any desired manner, such as by spray drying, drum drying, or the like.

Protamines obtained as a result of this process are found to have a high degree of purity as ascertained by negative ninhydrin tests, negative Pauly tests, and also by paper chromatogram. When a precipitant containing phosphorus is employed, the final product is also checked for phosphorus impurities and such tests are ordinarily found to be negative in such cases where the end product is a salt other than a phosphate.

The present process has the additional advantage in that high yields of protamine are recovered, usually between 1% and 2% calculated upon the weight of the original starting material. The protamines thus produced may be used for many purposes, but chiefly as pharmaceuticals or in combination with other substances which are employed in the field of medicine, nutrition, and the like.

Since certain changes in carrying out the above process and certain modifications in the composition which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In a process for obtaining protamines from fish milt, the steps comprising extracting fish milt with dilute acid, adding an alkaline reagent to the extract to precipitate substances other than protamines, recovering the filtrate, and adding an alkaloid reagent to the filtrate to convert the protamine to a salt thereof.

2. In a process for obtaining protamines from fish milt, the steps comprising extracting fish milt with dilute acid, adding an alkaline reagent to the extract to precipitate impurities, other than protamines, recovering the filtrate, adding an alkaloid reagent to the filtrate to precipitate the protamine, adding a mineral acid to the precipitate to convert the protamine into a water-soluble salt, and precipitating the protamine salt with a water-miscible organic solvent.

3. In a process for obtaining protamines from fish milt, the steps comprising washing the fish milt with dilute citric acid, extracting the fish milt with a dilute mineral acid, adding an alkaline reagent to the extract to precipitate substances other than protamines, recovering the filtrate, and adding an alkaloid reagent to the filtrate to convert the protamine to a salt thereof.

4. In a process for obtaining protamines from fish milt, the steps comprising mechanically grinding the fish milt, washing the ground milt with dilute citric acid, extracting the milt with dilute mineral acid, adding ammonia to the extract to precipitate substances other than protamines, recovering the filtrate, and adding an alkaloid reagent to the filtrate to convert the protamine to a salt thereof.

5. In a process for obtaining protamines from fish milt, the steps comprising mechanically grinding the fish milt, washing the ground milt with dilute citric acid, extracting the milt with dilute mineral acid, adding an alkaline reagent to the extract to precipitate substances other than protamines, recovering the filtrate, adding an alkaloid reagent to the filtrate to precipitate the protamine, adding a mineral acid to the precipitate to convert the protamine into a water-soluble salt, and precipitating the protamine salt with a water-miscible organic solvent.

6. In a process for obtaining protamines from fish milt, the steps comprising mechanically grinding the fish milt, washing the ground milt with dilute citric acid, extracting the milt with dilute mineral acid, adding ammonia to the extract to precipitate substances other than protamines, recovering the filtrate, adding metaphosphoric acid to the filtrate to precipitate the protamine, adding a mineral acid to the precipitate to convert the protamine into a water-soluble salt, and precipitating the protamine salt with a water-miscible organic solvent.

7. In a process for obtaining protamines from fish milt, the steps comprising mechanically grinding the fish milt, washing the ground milt with dilute citric acid, extracting the milt with dilute mineral acid, adding ammonia to the extract in an amount sufficient to adjust the pH to approximately 8 to 12 and thereby precipitate substances other than protamines, recovering the filtrate, and adding metaphosphoric acid to the filtrate to convert the protamine to a salt thereof.

8. In a process for obtaining protamines from salmon milt, the steps comprising extracting the salmon milt with dilute acid, adding an alkaline reagent to the extract to precipitate substances other than protamines, recovering the filtrate, and adding an alkaloid reagent to the filtrate to convert the protamine to a salt thereof.

9. In a process for obtaining protamines from herring milt, the steps comprising extracting herring milt with dilute acid, adding an alkaline reagent to the extract to precipitate substances other than protamines, recovering the filtrate, and adding an alkaloid reagent to the filtrate to convert the protamine to a salt thereof.

10. In a process for obtaining protamines from salmon milt, the steps comprising extracting the salmon milt with dilute mineral acid, adding an alkaline reagent to the extract in amount sufficient to precipitate substances other than protamines, recovering the filtrate, adding metaphosphoric acid to the filtrate to convert the protamine to a salt thereof, and recovering the protamine salt.

11. In a process for obtaining protamines from herring milt, the steps comprising extracting the herring milt with dilute mineral acid, adding an alkaline reagent to the extract in amount sufficient to precipitate substances other than protamines, recovering the filtrate, adding metaphosphoric acid to the filtrate to convert the protamine to a salt thereof, and recovering the protamine salt.

RICHARD J. BLOCK.

REFERENCES CITED

The following references are of record in the file of this patent:

Kossel: "The Protamines and Histones," Longmans, Green and Co., London (1928), pages 18–21, 73, 74 and 87.

Rasmussen: "Zeit. für Physiol. Chemie," vol. 224 (1934), pages 97, 98, 102–104.